US012566559B2

(12) United States Patent
Guim Bernat et al.

(10) Patent No.: US 12,566,559 B2
(45) Date of Patent: Mar. 3, 2026

(54) MANAGING MEMORY SYSTEM QUALITY OF SERVICE (QoS)

(71) Applicant: Intel Corporation, Santa Clara, CA (US)

(72) Inventors: Francesc Guim Bernat, Barcelona (ES); Karthik Kumar, Chandler, AZ (US); Tushar Sudhakar Gohad, Phoenix, AZ (US); Mark A. Schmisseur, Phoenix, AZ (US); Thomas Willhalm, Sandhausen (DE)

(73) Assignee: INTEL CORPORATION, Santa Clara, CA (US)

( * ) Notice: Subject to any disclaimer, the term of this patent is extended or adjusted under 35 U.S.C. 154(b) by 1004 days.

(21) Appl. No.: 16/846,994

(22) Filed: Apr. 13, 2020

(65) Prior Publication Data

US 2020/0278804 A1 Sep. 3, 2020

(51) Int. Cl.
*G06F 3/06* (2006.01)
*G06N 3/063* (2023.01)
(52) U.S. Cl.
CPC ............ *G06F 3/0637* (2013.01); *G06F 3/061* (2013.01); *G06F 3/0673* (2013.01); *G06N 3/063* (2013.01)

(58) Field of Classification Search
None
See application file for complete search history.

(56) References Cited

U.S. PATENT DOCUMENTS

| | | | | |
|---|---|---|---|---|
| 9,864,636 | B1 * | 1/2018 | Patel | ................... G06F 9/45533 |
| 2012/0254269 | A1 * | 10/2012 | Carmichael | ......... H04L 43/0876 |
| | | | | 709/224 |
| 2015/0172205 | A1 * | 6/2015 | Anderson | ............. G06F 9/5077 |
| | | | | 709/224 |

FOREIGN PATENT DOCUMENTS

DE      102020132767 A1    10/2021

* cited by examiner

*Primary Examiner* — Brian R Peugh
(74) *Attorney, Agent, or Firm* — JAFFERY WATSON HAMILTON & DESANCTIS LLP

(57) ABSTRACT

A memory request manager in a memory system registers a tenant for access to a plurality of memory devices, registers one or more service level agreement (SLA) requirements for the tenant for access to the plurality of memory devices, monitors usage of the plurality of memory devices by tenants, receives a memory request from the tenant to access a selected one of the plurality of memory devices, and allows the access when usage of the plurality of memory devices meets the one or more SLA requirements for the tenant.

9 Claims, 6 Drawing Sheets

STORAGE MEDIUM    500

502

COMPUTER EXECUTABLE
INSTRUCTIONS FOR APPARATUS 118

FIG. 5

MANAGING MEMORY SYSTEM QUALITY OF SERVICE (QoS)

TECHNICAL FIELD

Examples described herein are generally related to managing access to memory systems in a computing system.

BACKGROUND

Managing memory system Quality of Service (QoS) is typically implemented via controlling central processing unit (CPU) credits based on a process address space identifier (PASID)—where each PASID is allocated some credits and, based on these credits, some memory bandwidth is guaranteed by using the availability of queue entries that correspond to the credits. Memory controller QoS can also be implemented by controlling allocation of queue slots in the memory controller based on PASIDs.

There are several recent computing trends that may impact how QoS is implemented in the memory system: 1) the emergence of alternate means to attach to memory systems, such as via Computer Express Link (CXL) connections (a new high speed interconnect that enables high speed, efficient connections between the CPU and data center accelerators), via CXL switches, and other such interconnects; 2) the emergence of various additional compute engines, including various accelerators and field programmable gate arrays (FPGAs) that can be attached to the CPU via CXL; and 3) the emergence of multitenancy usages in the data center arising from the growth of cloud computing. With CXL and these emerging trends, a current mechanism of "throttling at the source" or limiting queue entries at the source (e.g., at the CPU) no longer applies, because arbitrary new devices can be added, and memory traffic from these new devices no longer go through the processor queues. This calls for a destination-based throttling scheme in the memory subsystem itself, as opposed to a source based throttling scheme in the CPU for ensuring QoS.

BRIEF DESCRIPTION OF THE DRAWINGS

FIG. 5 illustrates an example of a storage medium.

DETAILED DESCRIPTION

As contemplated in the present disclosure, new QoS mechanisms are included in a computing system and a memory system to achieve one or more service level agreement (SLA) requirements per tenant for implementing memory requests received from tenants being executed on multiple computing devices (such as CPUs, graphic processing units (GPUs), FPGAs, accelerators, storage devices, etc.). In an embodiment, one or more SLA requirements include one or more of latency requirements, bandwidth requirements, or other performance metrics requirements.

As used herein, a tenant comprises one or more applications, processes, tasks, FPGA bitstreams, applications within an AI accelerator, or other processing entity being executed by a computing device that requests access to memory resources (such as reading data from a memory device and writing data to a memory device). Tenants can include sub-tenants.

There is a need to be able to implement memory QoS through alternate means as compared to the conventional processor/memory controller path, and closer to the computing devices themselves. For example, a computer express link (CXL) attached accelerator accesses the same memory as processor cores of a CPU and consumes device memory bandwidth, however there is currently no means to limit the memory bandwidth used by the CXL-attached accelerator.

There is a need to have a globally unique ID for each tenant throughout individual computing systems, and throughout a cloud computing environment (e.g., a plurality of data centers operated by a cloud service provider for the benefit of cloud computing customers), for use in implementing memory system QoS, and the means to track memory resource usage based on this tenant ID throughout the cloud computing environment. For example, tenant A may comprise 10 processes accessing a memory from one computing device, each process having a different process ID, and tenant B may comprise 20 processes across four computing devices (including one or more accelerators), all of which are accessing the same memory as tenant A. It may be desirable, or even required according to an SLA, to guarantee that 50% of the bandwidth to that memory is always available and/or allocated to tenant B. To implement managing the memory system QoS, new mechanisms in the data center infrastructure (e.g., the cloud computing environment) are needed to be able to map and track memory requests based on tenant ID.

Figure 1:
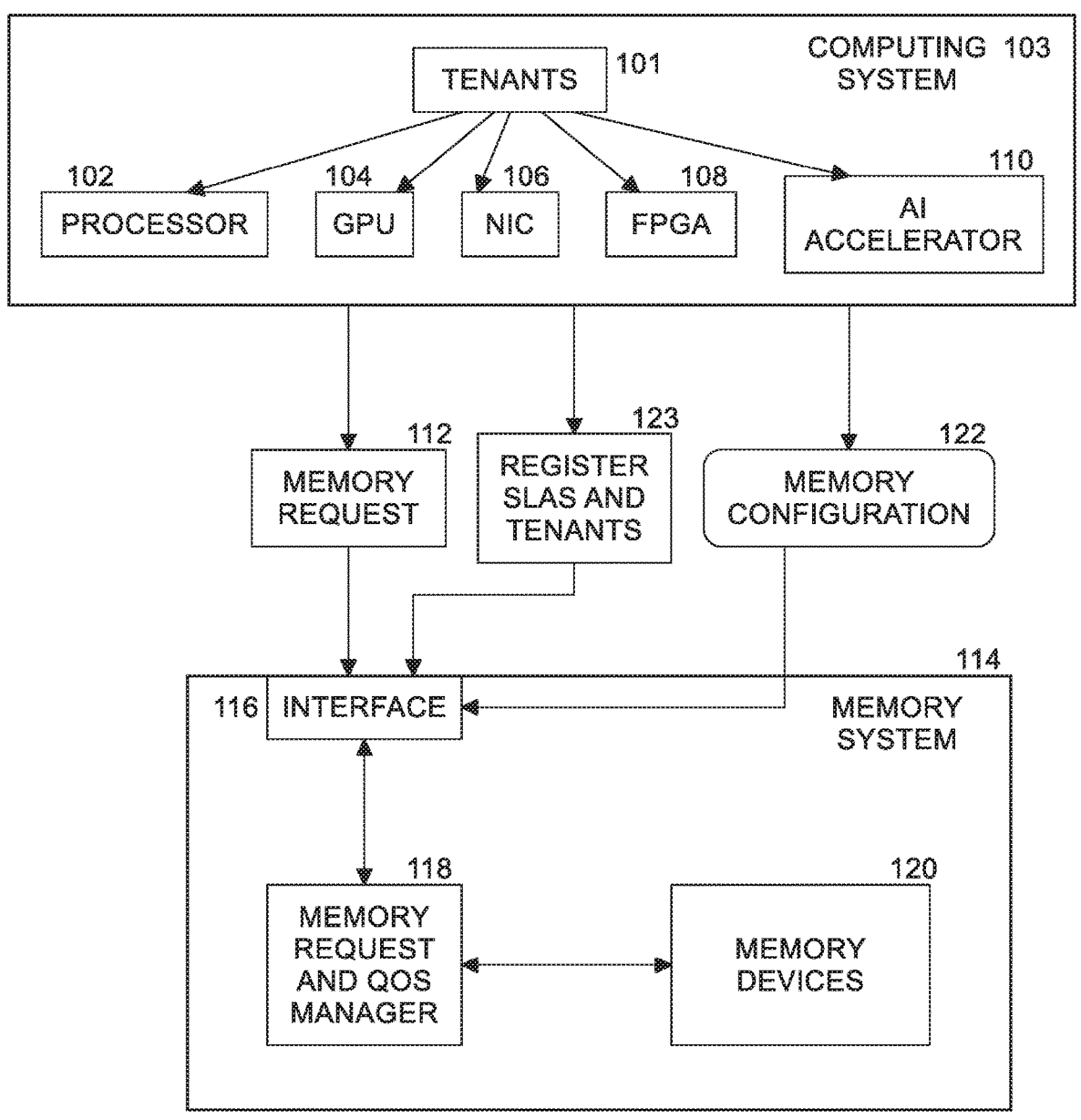
FIG. 1 illustrates an example of a system according to some embodiments.

FIG. 1 illustrates an example of a system 100 according to some embodiments. System 100 includes a computing system 103 comprising a plurality of computing devices to request access to memory, such as one or more processors 102 (each processor having one or more processing cores), zero or more GPUs 104, zero or more network interface cards (NICs) 106, zero or more FPGAs 108, and zero or more artificial intelligence (AI) accelerators 110. Other circuits, components, and devices (not shown in FIG. 1) in system 100 may also initiate memory requests. Tenants 101 execute on computing devices and initiate memory requests. Memory request 112 is sent by one of the computing devices to memory system 114 over an interconnect (such as CXL, for example, but the interconnect is not shown in FIG. 1) to read data from one or more memory devices 120 of memory system 114 or write data to one or more memory devices of the memory system. Memory request 112 is received via interface 116 of memory system 114 and forwarded to memory request and QoS manager 118. In an embodiment, memory request and QoS manager 118 manages the QoS (e.g., as specified by the SLA) requirements for access to memory system 114 for tenants 101 of system 100 and implements received memory requests to access one or more memory devices 120 of memory system 114 according to the QoS requirements. Configuration information 122 is input to memory request and QoS manager 118 via interface 116 for use in determining memory bandwidth allocation for memory devices 120. In an embodiment, configuration 122 defines parameters for managing memory system 114 (such as a prefetch policy, a power limit for the overall memory system, and other general memory configuration information not specific to a tenant). In an embodiment, memory configuration 122 is defined for a default setting for system 100 but may be overwritten or modified by a hypervisor (not shown in FIG. 1) or by actions of a system administrator for system 100.

A tenant 101 (having a globally unique tenant ID) sends one or more commands 123 to memory system 114 to register a tenant for QoS management and to specify one or more SLA requirements for the tenant. In an embodiment, a register SLA and tenant command includes one or more of a tenant ID, tenant tag, a priority level, and one or more SLA requirements (such as a bandwidth allocation (such as a percentage or other indicator) or a latency requirement). In an embodiment, a tenant tag is used for performing fast comparisons of tenants using content addressable memory (not shown in FIG. 1) according to well-known mechanisms. In an embodiment, an SLA comprises one or more requirements for allocation of memory resources (e.g., memory bandwidth, latency, other performance metrics) for system 100 for a tenant.

Figure 2:
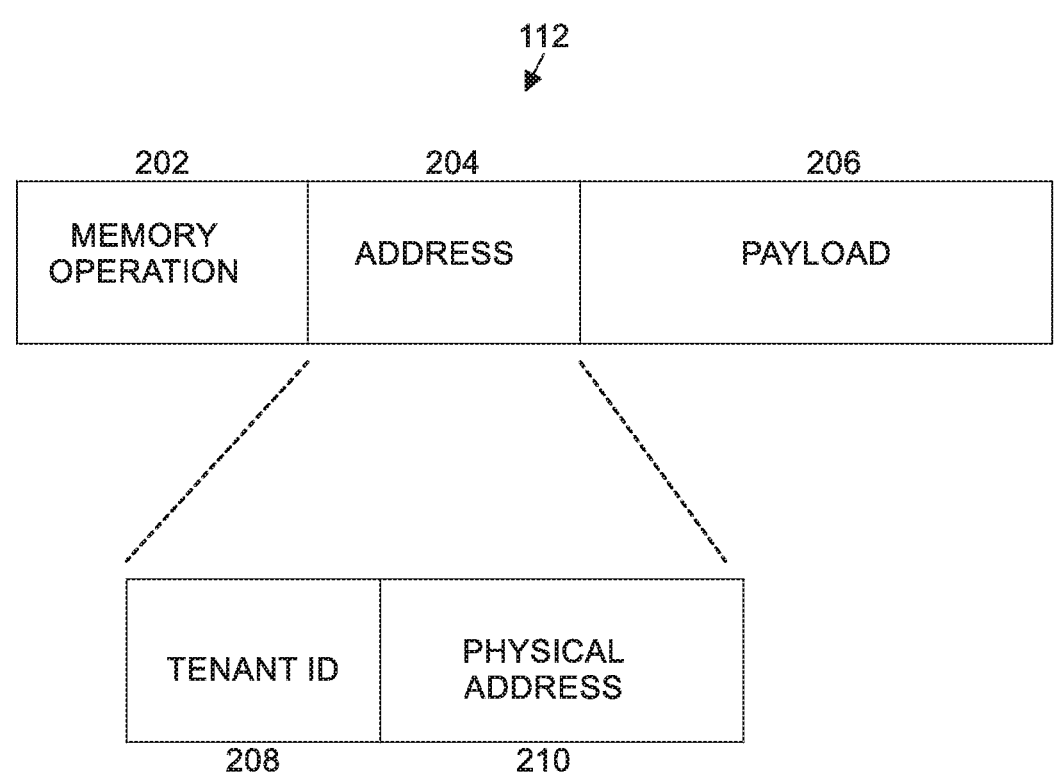
FIG. 2 illustrates an example of a memory request instruction according to some embodiments.

FIG. 2 illustrates an example of a memory request instruction 112 according to some embodiments. Memory request 112 includes memory operation 202, such as read or write. Memory request 112 includes payload 206, such as the data to be written to the memory. Memory request 112 includes address 204. Address 204 includes a physical address 210 in the memory (e.g., in memory devices 120) to be read from or written to. In an embodiment, address 204 also includes a globally unique tenant ID 208 storing the ID of the tenant requesting the memory access. In one embodiment, tenant ID 208 is stored in a first set of upper bits of address 204, and physical address 210 is stored in a second set of lower bits of address 204. In another embodiment, the locations of tenant ID 208 and physical address 210 are exchanged (e.g., the tenant ID is in the second set and the physical address is in the first set). In an embodiment, the number of bits in the first set and the number of bits in the second set is implementation dependent, depending on the computing devices requesting access to memory and memory subsystem 114.

Figure 3:
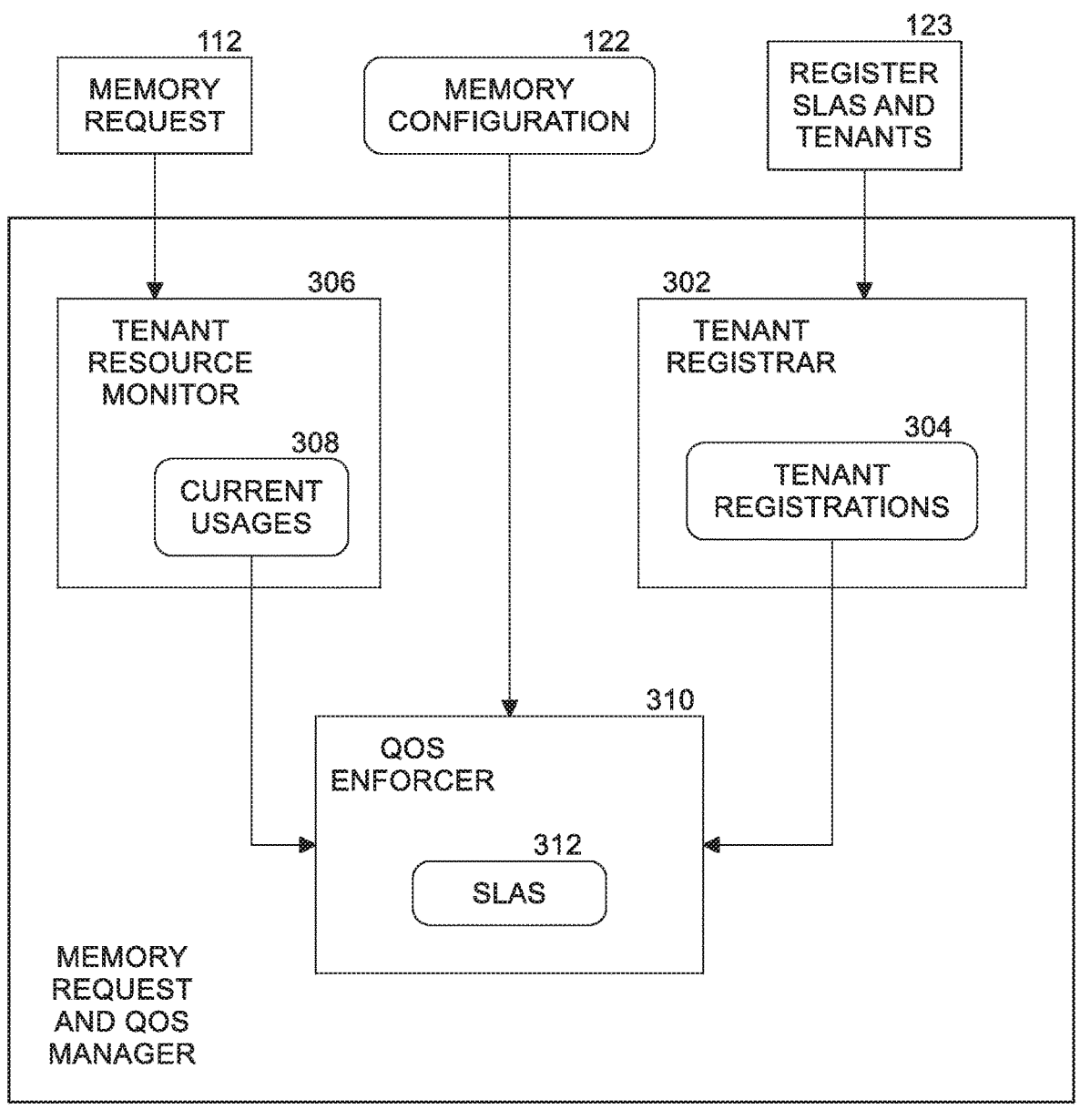
FIG. 3 illustrates an example memory request and QoS manager according to some embodiments.

FIG. 3 illustrates an example memory request and QoS manager 118 according to some embodiments. In an embodiment, memory request and QoS manager 118 comprises three separate components—tenant registrar 302, tenant resource monitor 306, and QoS enforcer 310. In other embodiments, any two or more of these components may be combined. In various embodiments, memory request and QoS manager 118 is implemented in software, firmware, hardware, or any combination.

Tenant registrar 302 receives commands to register a tenant and/or the tenant's SLA requirements. In one embodiment, a command includes both the tenant information and the one or more SLA requirements. In another embodiment, a register tenant command includes the information for registering a tenant identified by a tenant ID. In another embodiment, a register SLA command includes the one or more SLA requirements for a tenant identified by a tenant ID. Tenant registrar 302 stores received tenant registration information in tenant registrations 304. In an embodiment, tenant registrations 304 is implemented by any suitable data structure, such as a table or an array, for example, indexed by tenant ID or tenant tag. In an embodiment, tenant registrar 302 causes QoS enforcer 310 to store one or more SLA requirements for a tenant in SLAs 312. In an embodiment, SLAs 312 is implemented by any suitable data structure, such as a table or array, for example, indexed by tenant ID or tenant tag. In another embodiment, SLAs 312 is stored within or accessible by tenant registrar 302.

In an embodiment, a command 123 to register a tenant and/or an SLA is defined as an instruction in the instruction set architecture (ISA) of the computing device (e.g., one of processor 102, GPU 104, NIC 106, etc.).

Tenant resource monitor 306 receives memory requests 112 and, based at least in part on the requests to read memory and/or write memory, modifies current usages 308. Current usages 308 comprises statistical information regarding memory usage of memory devices 120 over time by one or more tenants. In an embodiment, current usages 308 is implemented by any suitable data structure, such as a table or array, for example, indexed by tenant ID or tenant tag. In an embodiment, successful completion of a memory request is included in updated current usages 308.

When a memory request is received, QoS enforcer 310 determines how and to what extent the memory request is to be implemented. QoS enforcer 310 accesses tenant registrations 304, SLAs 312, and current usages 308 to determine if the requesting tenant is valid and the memory request should be allowed (e.g., implemented or performed) based on the tenant's one or more SLA requirements 312 and the current usages 308 by the tenant (or in one embodiment, by all tenants). For example, if the tenant's one or more SLA requirements specify a maximum read/write limit per unit time of 5 GB and the current usage is only 1 GB, then QoS enforcer 310 allows memory request and QoS manager 118 to implement the request. However, if for example the tenant's one or more SLA requirements specify a maximum read/write limit per unit time of 5 GB and the current usage is 5 GB, then QoS enforcer does not allow memory request and QoS manager 118 to implement the request. Instead, an error message may be returned to the requesting tenant. In another example, if the requesting tenant is not currently using a selected bandwidth as a percentage of the overall bandwidth for a memory device 120, then QoS enforcer 310 allows memory request and QoS manager 118 to implement the request. However, if the requesting tenant already is using all bandwidth allocated to the tenant as a percentage of the overall bandwidth of a memory device 120, then QoS enforcer denies the request. In an embodiment, QoS enforcer 310 controls memory bandwidth and prioritization of memory requests for tenants by managing queue slots (not shown in FIG. 3) used to access a memory device 120. In an embodiment, QoS enforcer 310 operates periodically to check usages against SLA requirements per tenant and does not check usages for every received memory request.

In an embodiment a register SLA and tenant command 123 specifies latency and/or bandwidth values for a tenant 101. In an embodiment, tenant registrations 304 and/or SLAs 312 can only be accessed by a ring 0 component (e.g., in privileged mode) within compute devices 102-110. An entry SLAs 312 for a tenant 101 may include a tenant ID and SLA requirements assigned to the tenant. In an embodiment, the one or more SLA requirements may include one or more of a latency maximum value, a memory bandwidth maximum value over a period of time, and an indication as to whether the SLA requirements have a best-effort requirement or a guaranteed requirement. Memory request and QoS manager 118 uses these configuration settings per tenant to implement QoS policies.

In an embodiment, a tenant 101 may comprise a plurality of sub-tenants, and this structure may be applied recursively. In an embodiment, the relationship between a tenant and sub-tenants of the tenant comprises a hierarchical tree structure. Tenant registrations 304 and/or SLAs 312 may include information about the hierarchy of the tenant and sub-tenants. In an embodiment, the tenant comprises a plurality of sub-tenants and the memory request manager 118 allows a memory request to access a selected one of memory devices when usage of the plurality of memory devices meets the one or more SLA requirements for the tenant and all sub-tenants of the tenant.

To meet the one or more SLA requirements, memory request and QoS manager 118 checks that there is no oversubscription of the bandwidth to memory devices 120. The bandwidth to memory devices 120 may be partitioned into a best effort bandwidth partition where all tenants mapped to the best effort bandwidth partition will have a best effort to achieve the specified SLA requirements. The bandwidth to memory devices 120 may be partitioned into a guaranteed bandwidth partition where all tenants mapped to the guaranteed partition will have guaranteed access to the bandwidth, but if there is no bandwidth available on the guaranteed bandwidth partition an error may be returned in response to the memory request. Using tenant registrations 304 and/or SLAs 312, memory request and QoS manager 118 implements load balancing among all memory requests 112 coming from the compute devices 102-110 based on the two type of SLAs. In the case that the tenant 101 associated with a memory request 112 has a best effort SLA, memory request and QoS manager 118 will apply a best effort QoS to try to meet the SLA requirements for the tenant. In the case that the tenant 101 associated with the memory request 112 has a guaranteed SLA, memory request and QoS manager 118 will schedule the pending memory requests for that tenant up to the specified SLA requirements. Once the maximum value of the one or more SLA requirements is reached, the incoming memory requests for that tenant will be throttled.

In an embodiment, a system may include multiple memory systems/subsystems, for example, a first CXL based memory system (comprising a set of memory devices (e.g., DRAM)) and a second CXL based memory system (comprising a different set of memory devices (e.g., 3DXPoint based devices)) within the same server, each of which independently accepts tenant registrations and SLA registrations, and where the same tenant X may have registered one set of SLA/rules in the first CXL based memory system and a different set of SLA/rules in the second CXL based memory system.

In another embodiment, the capability to register inter-tenant SLAs is provided, where the SLA of a first tenant A is conditioned on the presence of another tenant B, wherein when tenant B is present, a priority of tenant A is increased so that tenant A and receives 50% of the bandwidth; otherwise tenant A receives only 10% of the bandwidth. This is an example of a SLA specification that cannot be done at the source (e.g., CPU) efficiently and needs to be done at the target (e.g., memory subsystem).

Figure 4:
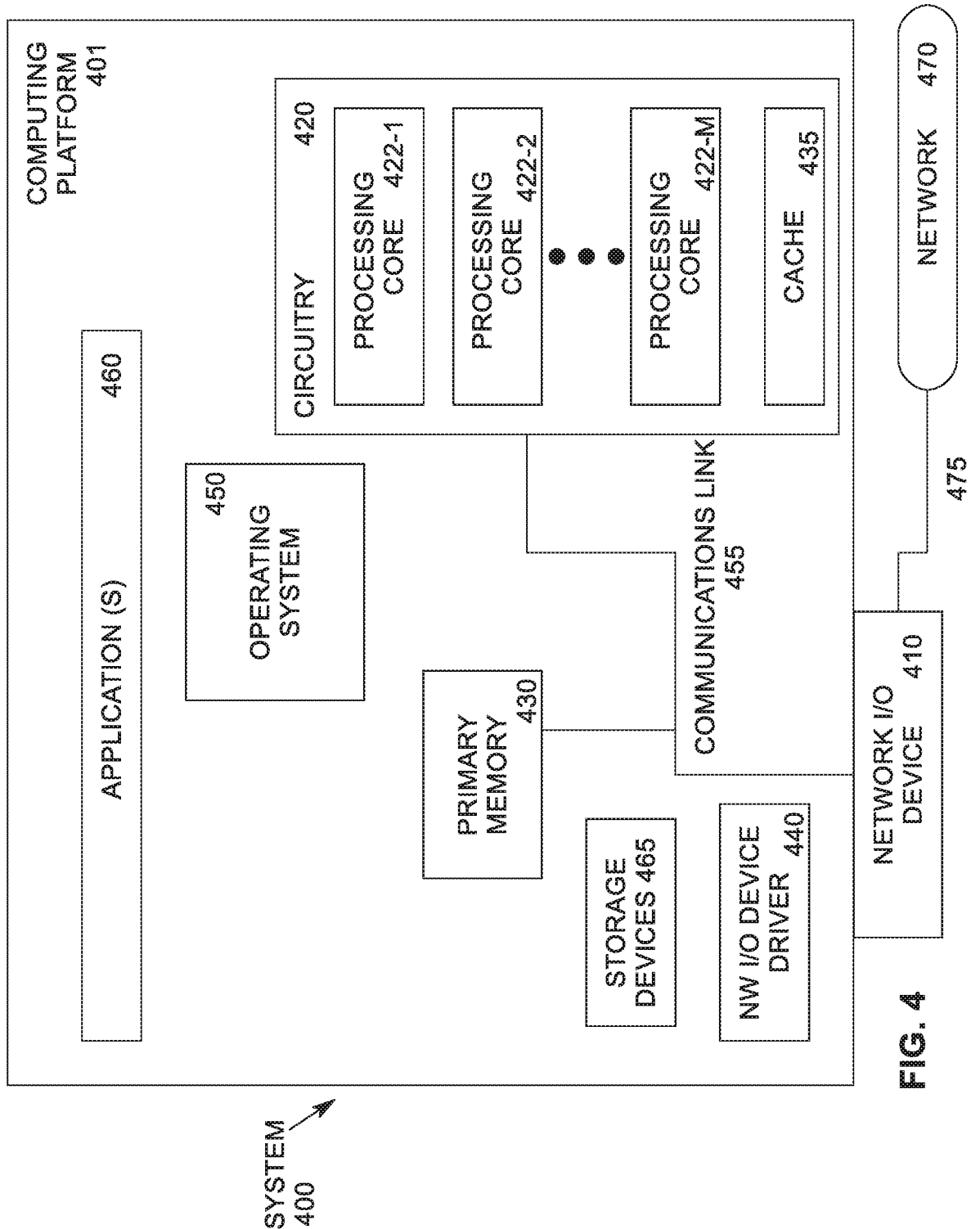
FIG. 4 illustrates an example computing platform.

FIG. 4 illustrates an example computing system 400. In an embodiment, computing system 400 is an example of at least portions of computing system 103 and/or memory system 114. As shown in FIG. 4, computing system 400 includes a computing platform 401 coupled to a network 470. In some examples, as shown in FIG. 4, computing platform 401 may couple to network 470 via a network communication channel 475 and through a network I/O device 410 (e.g., a network interface controller (NIC)) having one or more ports connected or coupled to network communication channel 475.

According to some examples, computing platform 401, as shown in FIG. 4, may include circuitry 420, primary memory 430, a network (NW) I/O device driver 440, an operating system (OS) 450, one or more application(s) 460, and storage devices 465 (such as memory system 114). In at least one embodiment, storage devices 465 may comprise one or more of hard disk drives (HDDs) and/or solid-state drives (SSDs). In an embodiment, storage devices 465 may be non-volatile memories (NVMs). In some examples, as shown in FIG. 4, circuitry 420 may communicatively couple to primary memory 430 and network I/O device 410 via communications link 455. Although not shown in FIG. 4, in some examples, operating system 450, NW I/O device driver 440 or application(s) 460 may be implemented, at least in part, via cooperation between one or more memory devices included in primary memory 430 (e.g., volatile or non-volatile memory devices) and elements of circuitry 420 such as processing cores 422-1 to 422-$m$, where "m" is any positive whole integer greater than 2.

In some examples, computing platform 401, may include, but is not limited to, a server, a server array or server farm, a web server, a network server, an Internet server, a work station, a mini-computer, a main frame computer, a super-computer, a network appliance, a web appliance, a distributed computing system, multiprocessor systems, processor-based systems, a laptop computer, a tablet computer, a smartphone, or a combination thereof. Also, circuitry 420 having processing cores 422-1 to 422-$m$ may include various commercially available processors, including without limitation Intel® Atom®, Celeron®, Core (2) Duo®, Core i3, Core i5, Core i7, Itanium®, Pentium®, Xeon® or Xeon Phi® processors; ARM processors, AMD processors, and similar processors. Circuitry 420 may include at least one cache 435 to store data.

According to some examples, primary memory 430 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 430 may include one or more hard disk drives within and/or accessible by computing platform 401.

Figure 5:
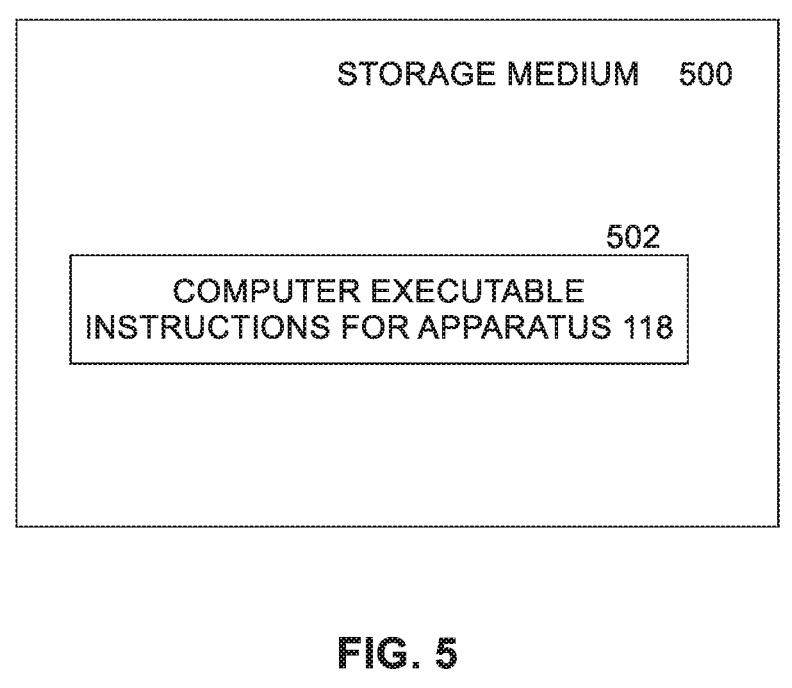

FIG. 5 illustrates an example of a storage medium 500. Storage medium 500 may comprise an article of manufacture. In some examples, storage medium 500 may include any non-transitory tangible computer readable medium or machine readable medium, such as an optical, magnetic or semiconductor storage. Storage medium 500 may store various types of computer executable instructions, such as instructions 502 for apparatus 118. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
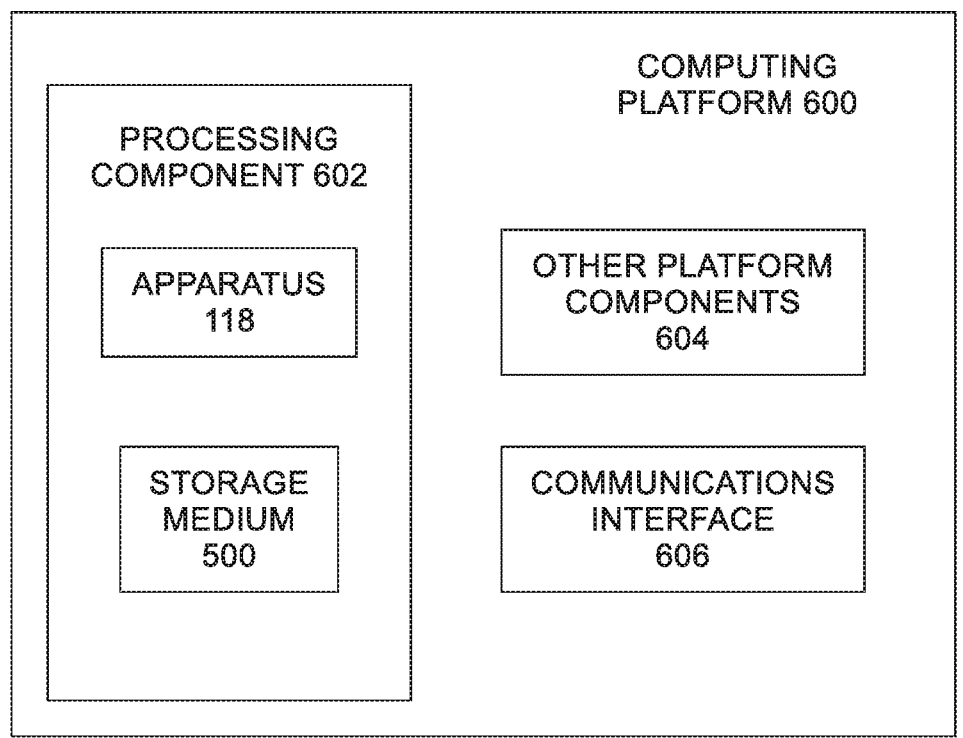
FIG. 6 illustrates another example computing platform.

FIG. 6 illustrates an example computing platform 600. In some examples, as shown in FIG. 6, computing platform 600 may include a processing component 602, other platform components 604 and/or a communications interface 606.

According to some examples, processing component 602 may execute processing operations or logic for apparatus 118 and/or storage medium 500. Processing component 602 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, AI cores, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 604 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 606 may include logic and/or features to support a communication interface. For these examples, communications interface 606 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 600 may be implemented using any combination of discrete circuitry, ASICs, logic gates and/or single chip architectures. Further, the features of computing platform 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one tangible, non-transitory machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGAs, AI accelerators/cores, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
processing circuitry coupled to memory circuitry, the memory circuitry to:
register one or more tenants, via one or more computing devices associated with the one or more tenants, seeking access to one or more memory devices, wherein the one or more tenants are registered based on one or more service level agreements (SLAs), wherein a tenant is registered based on and associated with a SLA that is specific to and customized for the tenant based on access patterns or usage history associated with the tenant;
monitor the tenants and maintain balance in usage associated with the one or more memory devices based, at least in part, on an access level associated with the tenant; and
in response to a request from the tenant, via a computing device associated with the tenant, to access a selected one of the one or more memory devices, allow or disallow the request to access based on ensuring the SLA that is specific to and customized for the tenant is not violated and that the balance in the usage of the one or more memory devices is continuously maintained.

2. The apparatus of claim 1, wherein the request includes an address, the address comprising an identifier (ID) of the tenant and a physical address of a memory device of the one or more memory devices, wherein the tenant ID includes a globally unique ID across a cloud computing environment.

3. The apparatus of claim 1, wherein the memory circuitry comprises:
tenant registrar circuitry to receive a register tenant command, to store tenant information relating to the tenant, the tenant information including the tenant ID, to receive a register SLA command, and to store one or more SLA requirements associated with the tenant;
tenant resource monitor circuitry to monitor usage of the one or more memory devices by the tenants based at least in part on a successful completion of received requests; and
enforcer circuitry to allow or disallow the access, wherein the processing circuitry comprises at least one of application processing circuitry or graphics processing circuitry.

4. A method comprising:

registering one or more tenants, by a computing device via one or more computing devices coupled to the computing device and associated with the one or more tenants, seeking access to one or more memory devices, wherein the one or more tenants are registered based on one or more service level agreements (SLAs), wherein a tenant is registered based on and associated with a SLA that is specific to and customized for the tenant based on access patterns or usage history associated with the tenant;

monitoring the tenants and maintain balance in usage associated with the one or more memory devices based, at least in part, on an access level associated with the tenant;

in response to a request from the tenant, via a computing device associated with the tenant, to access a selected one of the one or more memory devices, allowing or disallowing the request to access based on ensuring the SLA that is specific to and customized for the tenant is not violated and that the balance in the usage of the one or more memory devices is continuously maintained.

5. The method of claim 4, wherein the request includes an address, the address comprising an identifier (ID) of the tenant and a physical address of a memory device of the one or more memory devices, wherein the tenant ID includes a globally unique ID across a cloud computing environment.

6. The method of claim 4, further comprising:

receiving a register tenant command, to store tenant information relating to the tenant, the tenant information including the tenant ID, to receive a register SLA command, and to store one or more SLA requirements associated with the tenant;

monitoring usage of the one or more memory devices by the tenants based at least in part on a successful completion of received requests; and allowing or disallowing the access, wherein the computing device comprises processing circuitry coupled to memory circuitry, the processing circuitry comprising at least one of application processing circuitry or graphics processing circuitry.

7. At least one non-transitory computer-readable medium having stored thereon instructions which, when executed, cause a computing device to facilitate operations comprising:

register one or more tenants, via one or more computing devices coupled to the computing device and associated with the one or more tenants, seeking access to one or more memory devices, wherein the one or more tenants are registered based on one or more service level agreements (SLAs), wherein a tenant is registered based on and associated with a SLA that is specific to and customized for the tenant based on access patterns or usage history associated with the tenant device;

monitor the tenants and maintain balance in usage associated with the one or more memory devices based, at least in part, on an access level associated with the tenant;

in response to a request from the tenant to access a selected one of the one or more memory devices, allowing or disallowing the request to access based on ensuring the SLA that is specific to and customized for the tenant is not violated and that the balance in the usage of the one or more memory devices is continuously maintained.

8. The at least one non-transitory computer-readable medium of claim 7, wherein the request includes an address, the address comprising an identifier (ID) of the tenant and a physical address of a memory device of the one or more memory devices, wherein the tenant ID includes a globally unique ID across a cloud computing environment.

9. The non-transitory computer-readable medium of claim 7, wherein the operations further comprise:

receiving a register tenant command, to store tenant information relating to the tenant, the tenant information including the tenant ID, to receive a register SLA command, and to store one or more SLA requirements associated with the tenant;

monitoring usage of the one or more memory devices by the tenants based at least in part on a successful completion of received requests; and allowing or disallowing the access, wherein the computing device comprises processing circuitry coupled to memory circuitry, the processing circuitry comprising at least one of application processing circuitry or graphics processing circuitry.

* * * * *